(12) United States Patent
Cezeaux et al.

(10) Patent No.: US 7,444,665 B2
(45) Date of Patent: Oct. 28, 2008

(54) INTERACTIVE TELEVISION SYSTEM

(76) Inventors: Thomas Edward Cezeaux, 15429 135th Pl. NE., Woodinville, WA (US) 98072; Derek K. Vogel, 16920 128th Pl. NE., Woodinville, WA (US) 98072

(*) Notice: Subject to any disclaimer, the term of this patent is extended or adjusted under 35 U.S.C. 154(b) by 619 days.

(21) Appl. No.: 10/039,292

(22) Filed: Jan. 3, 2002

(65) Prior Publication Data

US 2002/0108111 A1  Aug. 8, 2002

Related U.S. Application Data

(60) Provisional application No. 60/260,082, filed on Jan. 3, 2001.

(51) Int. Cl.
*H04N 7/173* (2006.01)
*H04N 7/16* (2006.01)

(52) U.S. Cl. ............ 725/112; 725/93; 725/136

(58) Field of Classification Search .......... 725/86, 725/87, 91–93, 112, 136
See application file for complete search history.

(56) References Cited

U.S. PATENT DOCUMENTS

| | | | |
|---|---|---|---|
| 4,862,268 A | 8/1989 | Campbell | |
| 5,479,266 A | 12/1995 | Young | |
| 5,585,838 A | 12/1996 | Lawler | |
| 5,604,528 A | 2/1997 | Edwards | |
| 5,619,249 A | 4/1997 | Billock | |
| 5,703,655 A | 12/1997 | Corey et al. | |
| 5,751,335 A | 5/1998 | Shintani | |
| 5,768,539 A | 6/1998 | Metz | |
| 5,809,471 A | 9/1998 | Brodsky | |
| 5,894,516 A | 4/1999 | Brandenburg | |
| 5,940,073 A | 8/1999 | Klosterman et al. | |
| 6,002,394 A | 12/1999 | Schein | |
| 6,005,565 A | 12/1999 | Legall | |
| 6,018,372 A | 1/2000 | Etheredge | |
| 6,025,837 A | 2/2000 | Matthews, III | |
| 6,025,869 A | 2/2000 | Stas | |
| 6,026,368 A | 2/2000 | Brown et al. | |
| 6,028,600 A | 2/2000 | Rosin | |
| 6,037,933 A | 3/2000 | Blonstein | |
| 6,085,224 A * | 7/2000 | Wagner | 709/203 |
| 6,144,376 A | 11/2000 | Connelly | |
| 6,154,771 A * | 11/2000 | Rangan et al. | 709/217 |
| 6,177,931 B1 * | 1/2001 | Alexander et al. | 725/52 |
| 6,182,287 B1 | 1/2001 | Schneidewend | |
| 6,195,692 B1 | 2/2001 | Hsu | |
| 6,262,722 B1 | 7/2001 | Allison | |
| 6,266,369 B1 | 7/2001 | Wang | |
| 6,268,849 B1 | 7/2001 | Boyer | |

(Continued)

FOREIGN PATENT DOCUMENTS

EP  0 692 790  1/1996

(Continued)

OTHER PUBLICATIONS

Merriam-Webster's Collegiate Dictionary, 2001, Merriam-Bebster, Inc., Tenth Edition, p. 760.*

*Primary Examiner*—Hunter B. Lonsberry
(74) *Attorney, Agent, or Firm*—Michael Haynes PLC; Michael N. Haynes; Dale R. Jensen (57) ABSTRACT

An interactive television system is described.

20 Claims, 13 Drawing Sheets

U.S. PATENT DOCUMENTS

| | | | |
|---|---|---|---|
| 6,323,911 B1 | 11/2001 | Schein | |
| 6,349,410 B1 | 2/2002 | Lortz | |
| 6,367,078 B1 | 4/2002 | Lasky | |
| 6,481,012 B1 | 11/2002 | Gordon | |
| 6,499,138 B1 | 12/2002 | Swix | |
| 6,560,777 B2* | 5/2003 | Blackketter et al. | 725/110 |
| 6,571,392 B1* | 5/2003 | Zigmond et al. | 725/110 |
| 6,594,656 B1* | 7/2003 | Arlein et al. | 707/4 |
| 6,637,032 B1* | 10/2003 | Feinleib | 725/110 |
| 6,664,984 B2 | 12/2003 | Schlarb | |
| 6,684,400 B1 | 1/2004 | Goode | |
| 6,701,528 B1 | 3/2004 | Arsenault | |
| 6,732,367 B1* | 5/2004 | Ellis et al. | 725/28 |
| 6,880,765 B2 | 4/2005 | Tuomikoski | |
| 6,898,762 B2 | 5/2005 | Ellis | |
| 7,174,512 B2 | 2/2007 | Martin | |
| 7,188,356 B1 | 3/2007 | Miura | |
| 2001/0039584 A1 | 11/2001 | Nobakht | |
| 2002/0019986 A1 | 2/2002 | Kikinis | |
| 2002/0047894 A1 | 4/2002 | Steading | |
| 2002/0059629 A1* | 5/2002 | Markel | 725/100 |
| 2002/0078443 A1* | 6/2002 | Gadkari et al. | 725/32 |
| 2002/0087982 A1 | 7/2002 | Stuart | |
| 2002/0157109 A1 | 10/2002 | Nakano | |
| 2005/0028208 A1 | 2/2005 | Ellis | |
| 2006/0095937 A1 | 5/2006 | Knudson | |

FOREIGN PATENT DOCUMENTS

| | | |
|---|---|---|
| EP | 0692790 | 1/1996 |
| JP | 10248020 | 9/1998 |
| WO | 1999/065242 | 12/1999 |
| WO | WO99/65242 | 12/1999 |
| WO | 2000/049801 | 8/2000 |
| WO | WO00/49801 | 8/2000 |

* cited by examiner

INTERACTIVE TELEVISION SYSTEM

CROSS-REFERENCED TO RELATED APPLICATION

This application claims the benefit of U.S. Provisional Application No. 60/260,082 filed on Jan. 3, 2001, which is hereby incorporated by reference in its entirety.

BACKGROUND

The described technology relates generally to program guides and specifically to improvements for electronic program guides.

Electronic program guides have been used extensively to allow users to view programming information for available television channels and to select which television channel to watch. Electronic program guides are typically provided by set-top boxes that are connected to a content feed (e.g., cable or satellite) and to a television on the other end. Set-top boxes may access programming information (e.g., channel, title, and start time) provided through the content feed (e.g., on a designated channel) and generate a display of that information referred to as an electronic program guide. Electronic program guides are generally displayed in a grid format with start time information displayed horizontally and channel information displayed vertically. Each cell of the grid may contain the title on the content. Set-top boxes typically allow a user to use a remote control to scroll through and select a channel to be watched.

Although electronic program guides help a viewer to locate and select a channel that the viewer wants to watch, some capabilities provided by current electronic program guides are more difficult than they need to be. For example, current electronic program guides typically allow a user to view programming information for days other than the current day. These electronic program guides, however, may force a user to take multiple actions to view program listings for another day. Similarly, electronic program guides typically have different formatted guides for different types of content. For example, one format may be used for displaying television programming information, another format may be used for video-on-demand programming information, and a different format may be used to display web content information. Since electronic program guides are typically controlled by remote controls, navigation from one screen to another can be difficult. As a result, minimizing the number of navigation steps is desirable.

It is well known that some content is objectionable to some viewers. For example, some viewers may find X-rated movies objectionable. Some television systems allow users to filter out such objectionable content so that when the content is selected it cannot be viewed. Electronic program guides list the titles of such objectionable content. Some viewers may find even such titles objectionable.

It would be desirable to have an electronic program guide that would minimize problems associated with current electronic program guides.

DETAILED DESCRIPTION

Methods and systems related to an interactive television system are provided. In one embodiment, the interactive system provides an interactive program guide ("IPG") that facilitates the selection of various types of program content. One aspect of the interactive system allows a user to quickly select the day of the week for which the interactive program guide is to cover. The interactive system displays the interactive program guide for one day and includes a mechanism for selecting from that interactive program guide another day's program guide. In one embodiment, the mechanism includes a button for each day of the week. When a user selects the button, the interactive system displays the interactive program guide for that day of the week. In another embodiment, the mechanism includes an indication to select a button on a remote control to display the interactive program guide for the previous day or next day. In this way, the user can quickly switch from one day to another day from the interactive program guide itself.

Another aspect of the interactive system allows a user to filter out objectionable information associated with an interactive program guide. For example, the interactive system may replace the titles of X-rated movies with an indication that no programming is available. In one embodiment, the interactive system may provide a filtering mechanism through which the user can specify filtering criteria. The filtering criteria may be based on movie ratings, movie genres, keywords associated with the movie, attributes of the content, and so on. When generating an interactive program guide for display, the interactive system determines whether content meets the filtering criteria. If not, the interactive system replaces the title of that content on the interactive program guide. Additionally, the interactive system may apply the filter criteria to the available channels. If a channel does not satisfy a filter criterion, then the interactive system may completely remove that channel from the interactive program guide. For example, the interactive system may completely remove a channel that shows only X-rated movies rather than simply replace the titles of the content. In this way, in addition to the objectionable content being filtered out, information describing objectionable content can also be filtered out.

Another aspect of the interactive system provides an integrated interactive program guide to display television programming information and on-demand programming information of the single interactive program guide. The on-demand programming information may include video-on-demand programming, accessible web content information, and other non-broadcast content information. The interactive system retrieves television programming information and on-demand programming information and combines the information into a single interactive program guide. In this way, a user can access information for different types of programming from a single interactive program guide.

Another aspect of the interactive system allows an interactive program guide to illustrate content duration using cells of the interactive program guide that have a regular size. In one embodiment, the cells of the interactive program guide have the same height and width. Interactive program guides are typically organized with time slots displayed horizontally and with channels displayed vertically. The interactive system allows the duration of content to be illustrated by highlighting multiple cells of a regular size when any cell of the content is selected. For example, if each cell represents a 30-minute time slot, then four cells would be highlighted when one of the four cells of a 2-hour movie was selected. In this way, although the cells have a regular size, the irregular length of content can be illustrated.

Another aspect of the interactive system allows Advanced Television Enhancement Forum ("ATVEF") information to be dynamically embedded into video and to be customized to the user. In one embodiment, the interactive system receives a request to send a video to a user. The interactive system retrieves profile information for that user and modifies the video by adding ATVEF information based on the retrieved profile. The interactive system then transmits the modified video to the user. The video may be on-demand video or a broadcasted video. In one embodiment, the interactive system may analyze close caption information associated with the video to further identify the ATVEF information that should be added to the video. In this way, interactivity or additional information can be added to on-demand or broadcast videos, and the videos can be customized based on the user's profile.

Figure 1:
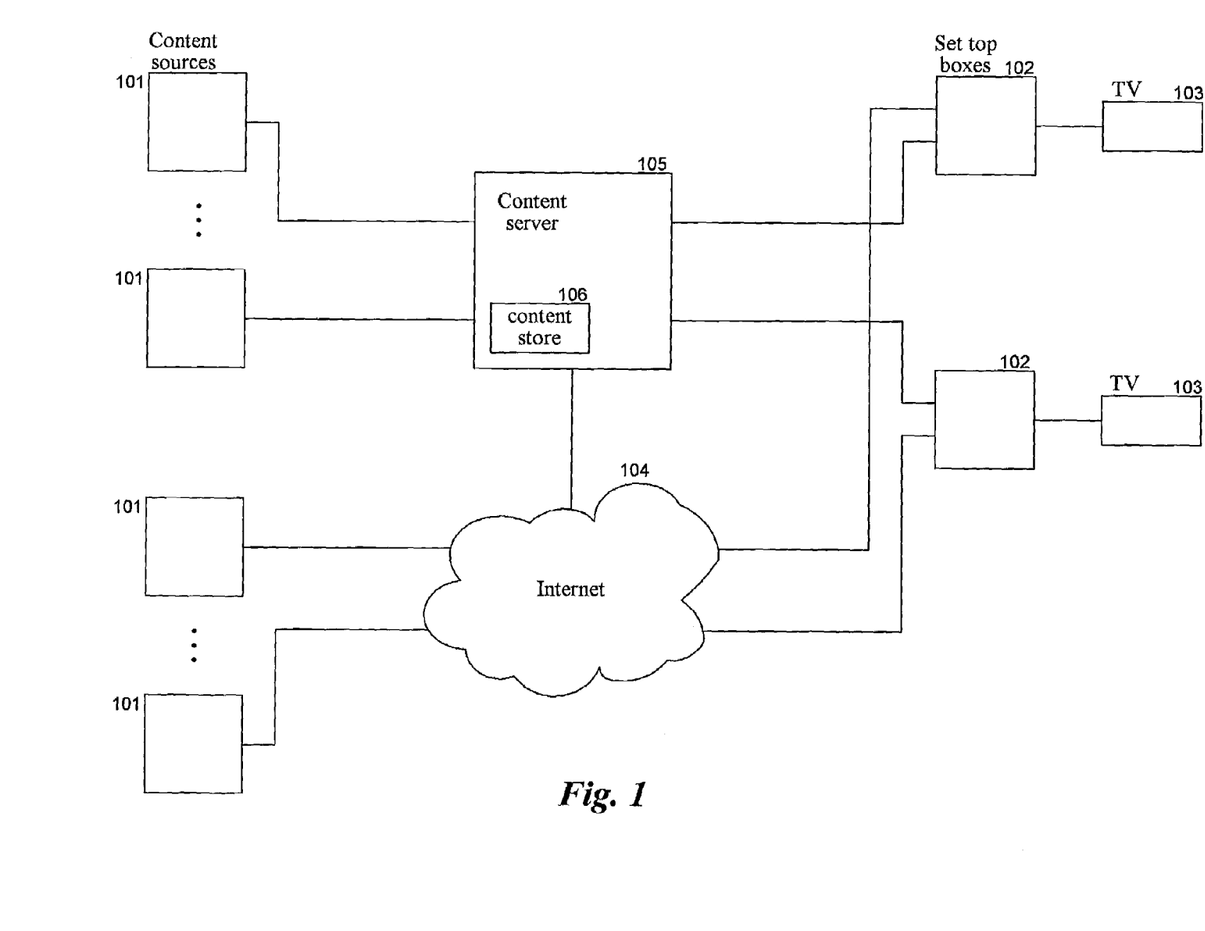
FIG. 1 is a block diagram illustrating components of an interactive system in one embodiment.

FIG. 1 is a block diagram illustrating components of an interactive system in one embodiment. The interactive system comprises components that execute on content server 105 and set-top boxes 102. The content server receives content from various content feeds 101. The content feeds may include pay-per-view movies transmitted via satellite, television programming transmitted via cable, and so on. The content server routes content selected by a subscriber or user to the appropriate set-top box. The set-top boxes controls the display of the content on the televisions 103. The set-top boxes responsible provide the interactive program guide to the user. The set-top boxes may also provide access to various content sources via the Internet 104. The content server may include a content store 106 that contains videos that can be supplied to the set-top boxes on demand. Although not shown, the content server may contain databases of subscriber information, a billing component, an authentication component, and so on.

Figure 2:
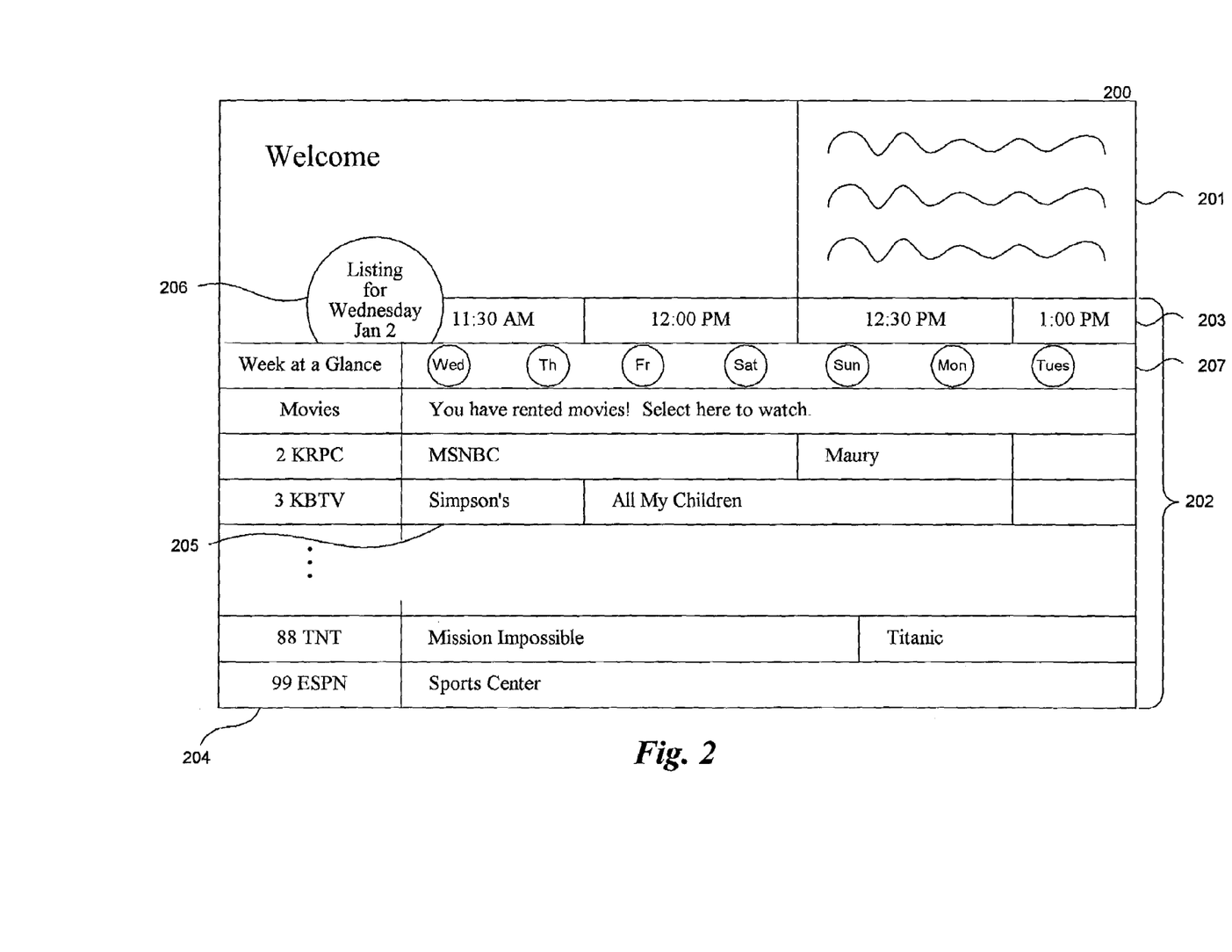
FIG. 2 illustrates an example interactive program guide that allows a user to select another day directly from the currently displayed interactive program guide.

FIG. 2 illustrates an example interactive program guide that allows a user to select another day directly from the currently displayed interactive program guide. The interactive system displays a program guide for a selected day along with an indication of an action that the user is to perform to display an interactive program guide for another day. In this example, interactive program guide 200 includes television display area 201 and program grid 202. The television display area may display the content from the currently selected channel as the user browses through the interactive program guide. The program grid includes start times 203 displayed horizontally and channels 204 displayed vertically. The intersection of the start times and channels are cells 205 that contain the title on the content. In this example, the width of a cell corresponds to the duration of the content. The current day field 206 displays the day of the week for the currently displayed interactive program guide. In this example, the interactive program guide is currently displayed for Wednesday January 2. The interactive program guide also includes a week-at-a-glance row 207. The row contains a button for each day of the week starting with the current day of the week. When a user selects one of the buttons, the interactive system displays the interactive program guide for that day for the same time as currently displayed.

Figure 3:
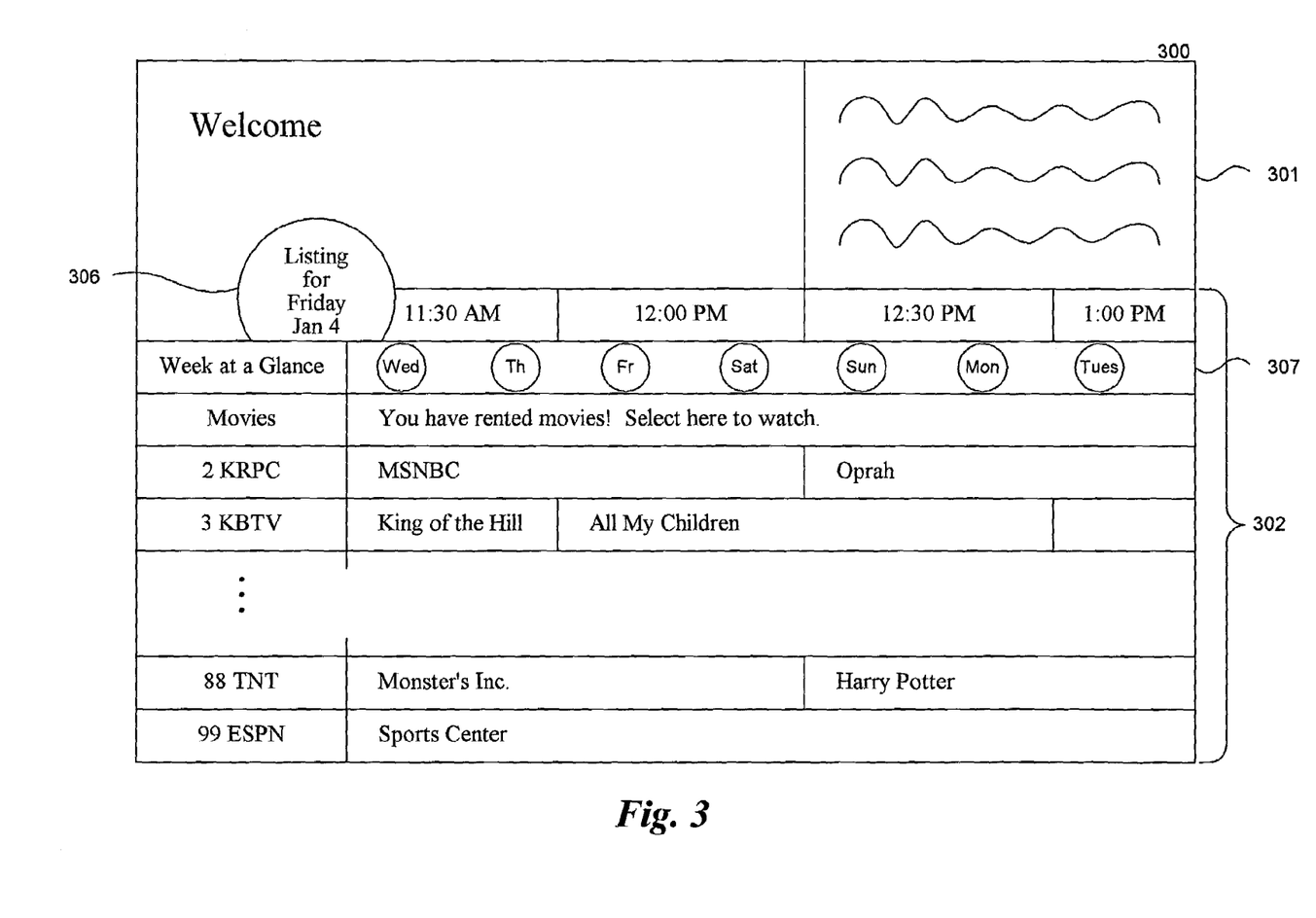
FIG. 3 illustrates an example interactive program guide that is display after the user selects another day's button.

FIG. 3 illustrates an example interactive program guide that is display after the user selects another day's button. The interactive program guide 300 includes television display area 301 and program grid 302. The interactive program guide has the same overall appearance as that of FIG. 2. The current day field 306 now indicates that the currently selected day is Friday January 4th. The user can select the buttons of the week-at-a-glance row 307 to view the interactive program guide for other days within the same week. For example, the user can select the Wednesday button to re-display the interactive program guide illustrated in FIG. 2.

Figure 4:
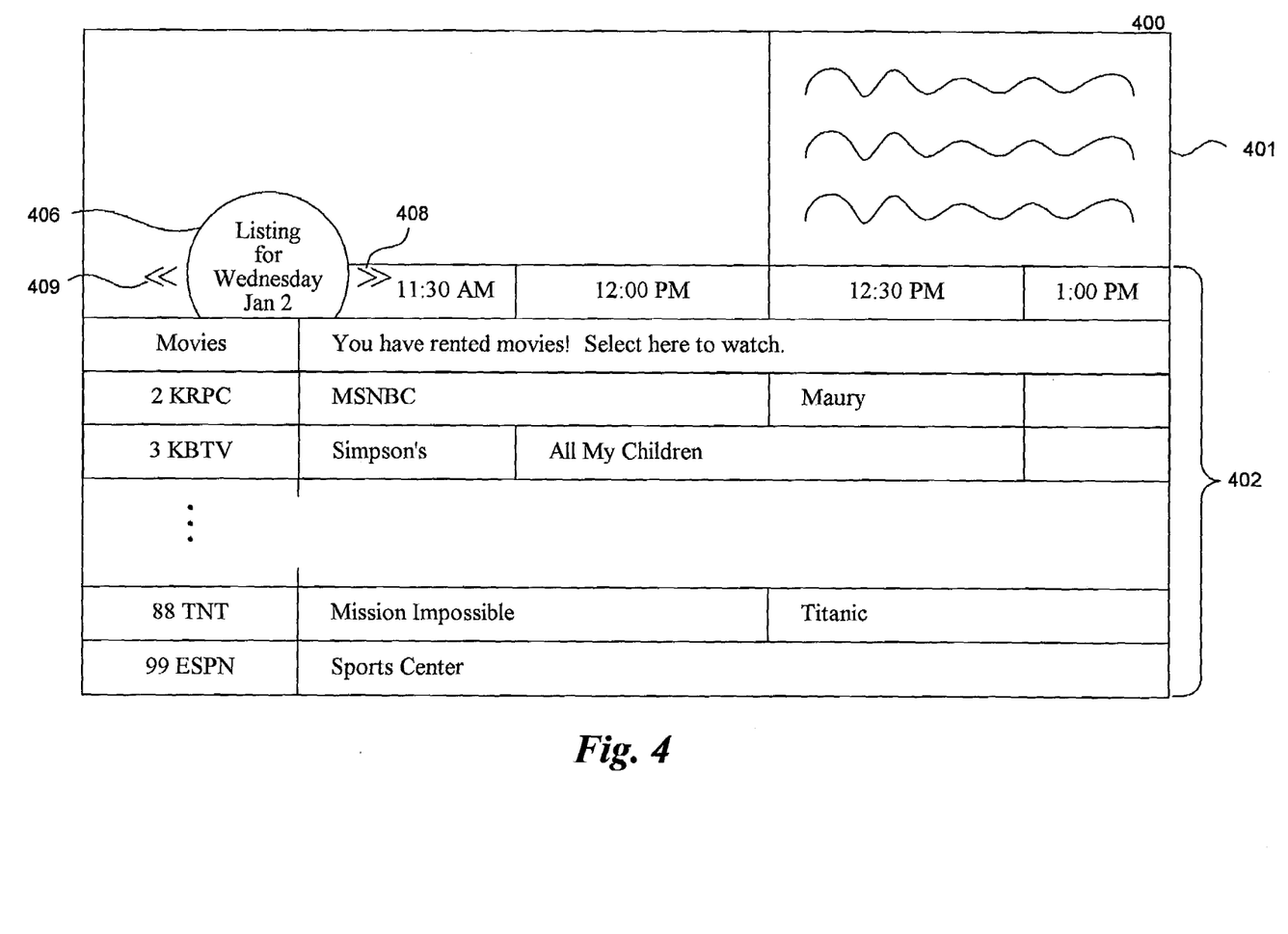
FIG. 4 illustrates an example interactive program guide in an alternate mechanism for selecting another day of the week.

FIG. 4 illustrates an example interactive program guide in an alternate mechanism for selecting another day of the week. Interactive program guide 400 has the same overall appearance as interactive program guides of FIGS. 2 and 3. The interactive program guide 400, however, does not include a week-at-a-glance row. Rather, the current day field has a next indicator 408 and a previous day indicator 409 adjacent to it. These indicators indicate that the user should select the skip forward button of the remote control to select the next day, and the rewind button of the remote control to select the previous day. Alternatively, these indicators indicate to select the fast forward or fast rewind buttons of the remote control. This alternate mechanism allows a user to select days outside the current week including the days before the current day of the week.

Figure 5:
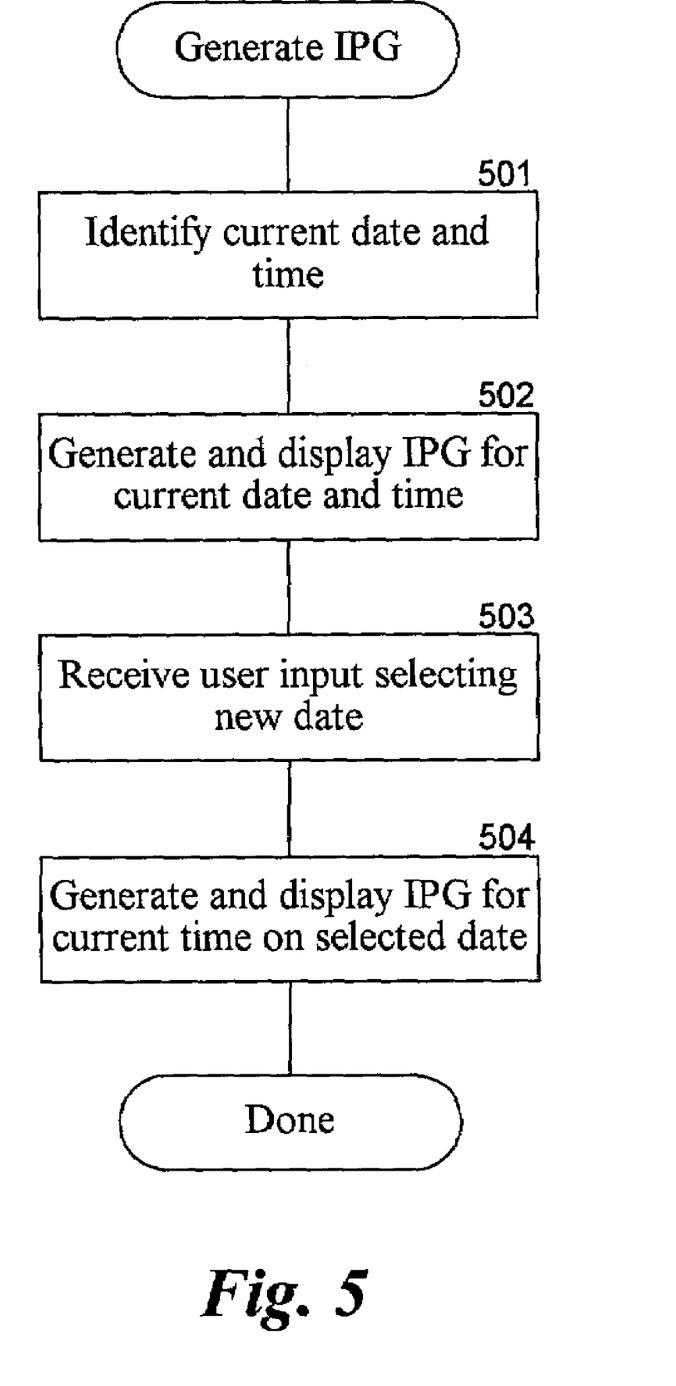
FIG. 5 is a flow diagram illustrating an implementation of a component to generate an interactive program guide in one embodiment.

FIG. 5 is a flow diagram illustrating an implementation of a component to generate an interactive program guide in one embodiment. The component may execute on a set-top box. In block 501, the component identifies the current date and time from, for example, a system clock. In block 502, the component generates and displays an interactive program guide for the current date and time determined in block 501. In block 503, the component receives user input selecting a new date. Such user input may be received via various input devices, in response to the display of various input controls, or no prompting display. In block 504, the component generates and displays an additional interactive program guide for the current time—identified in block 501—on the date selected in block 503. The component then completes.

Figure 6:
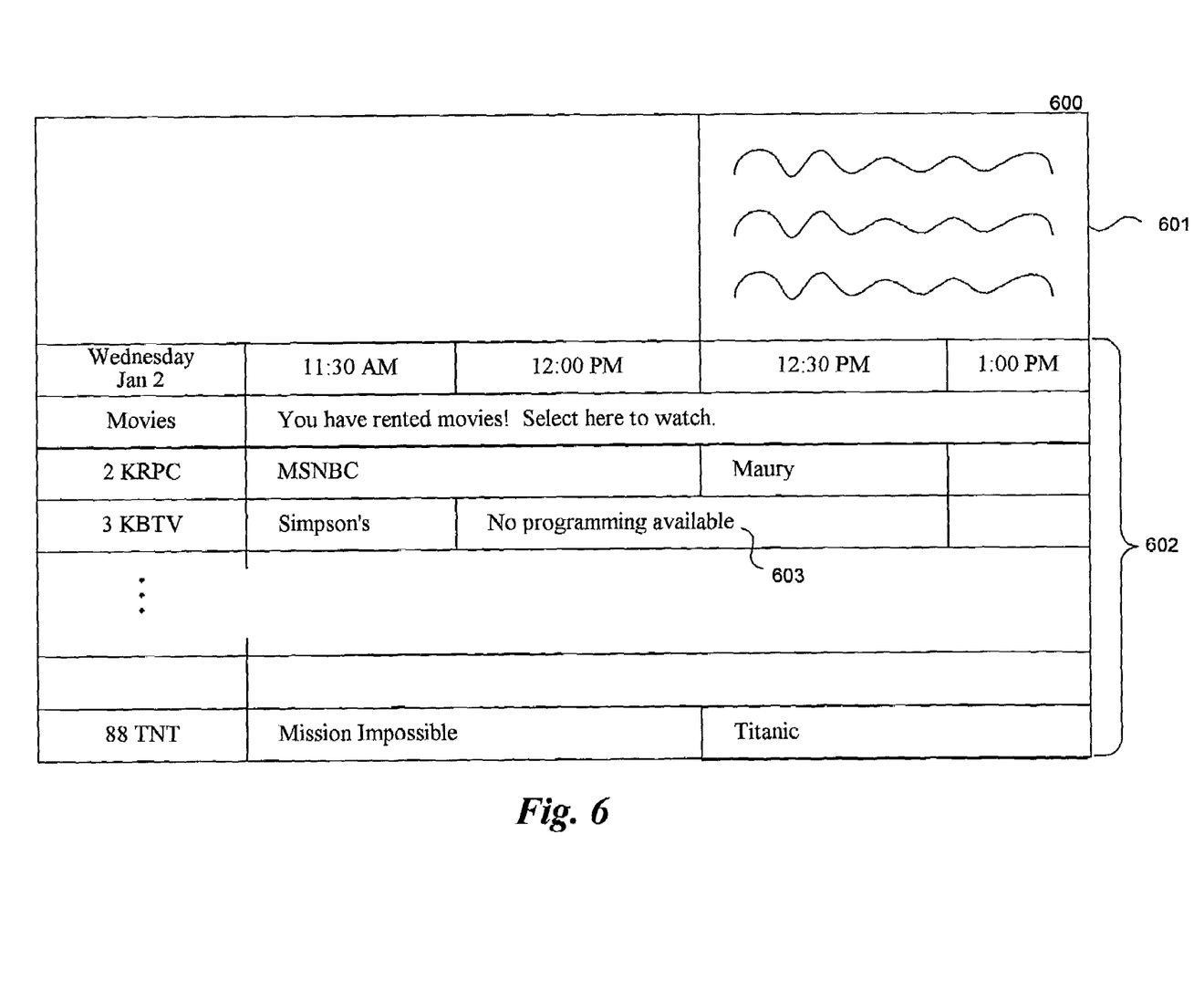
FIG. 6 illustrates an example interactive program guide for which objectionable information has been filtered out.

FIG. 6 illustrates an example interactive program guide for which objectionable information has been filtered out. The interactive system provides a mechanism for specifying filter criteria for objectionable material. The filter criteria can be based on content rating, content attributes, country of origin of the content, the user's country, and so on. When generating an interactive program guide, the interactive system retrieves programming information that includes attributes of the available content. The interactive system then applies the filter criteria to each of the available content indicated in the programming information to determine whether the available content meets the filter criteria. If it does not meet the filter criteria, then the content's programming information is omitted from the interactive program guide. For example, the title of the content of the may be blanked out or replaced by a title that indicates that "No programming is available." The interactive system may also completely omit rows of the interactive program guide whose content is determined to be objectionable. Thus, the interactive system can omit objectionable information on a row-by-row basis (e.g., a channel) or on a cell-by-cell (e.g., content of a channel) basis. The interactive program guide 600 includes television display area 601 and program grid 602. In this example, the interactive system determined that the television show that is scheduled to be broadcast on channel 3 at 12:00 PM did not pass all the filter criteria. Thus, the title of the program show "All My Children" was replaced by the title "No programming available." Also, the row for channel 99 as shown on FIG. 2 has been omitted because channel 99 did not pass all the filter criteria.

Figure 7:
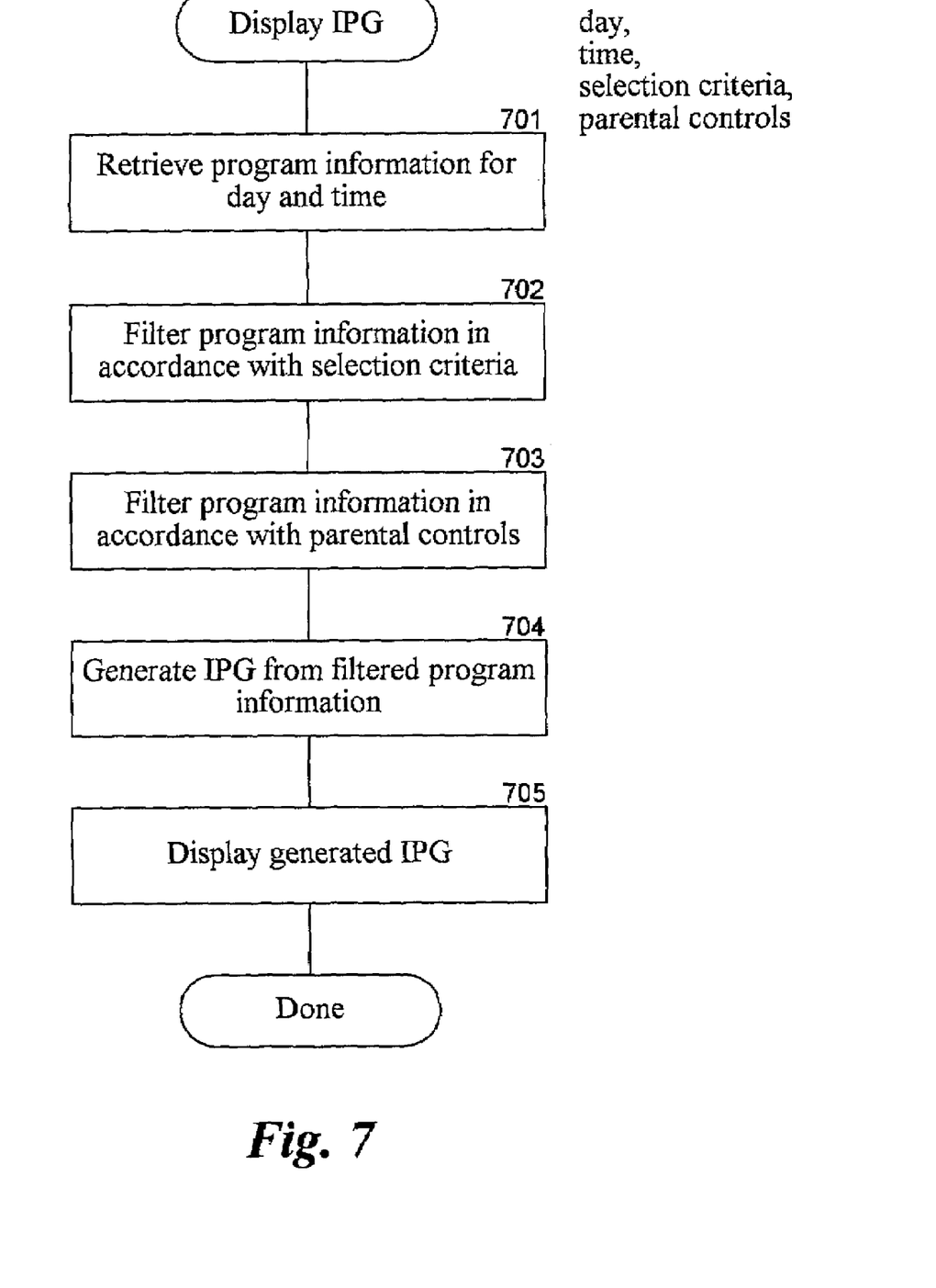
FIG. 7 is a flow diagram illustrating an implementation of a component that remove information about objectionable content in one embodiment.

FIG. 7 is a flow diagram illustrating an implementation of a component that removes information about objectionable content in one embodiment. The component that removes objectionable content is passed an indication of the selected day and time for the interactive program guide, as well as selection criteria for selecting programs about which to display information, such as program genres, and parental controls, such as limits on the content ratings on programs about which information is to be displayed. Both selection criteria and potential controls may be configured by a user, or may be set in another fashion. In block 701, the component retrieves the programming information for the passed day and time. In block 702, the component filters the retrieved program information in accordance with the specified selection criteria. In block 703, the component further filters the retrieved program information in accordance with the specified parental controls. In block 704, the component generates the interactive program guide based on the filtered programming information. In block 705, the component displays the generated interactive program guide and then completes.

Figure 8:
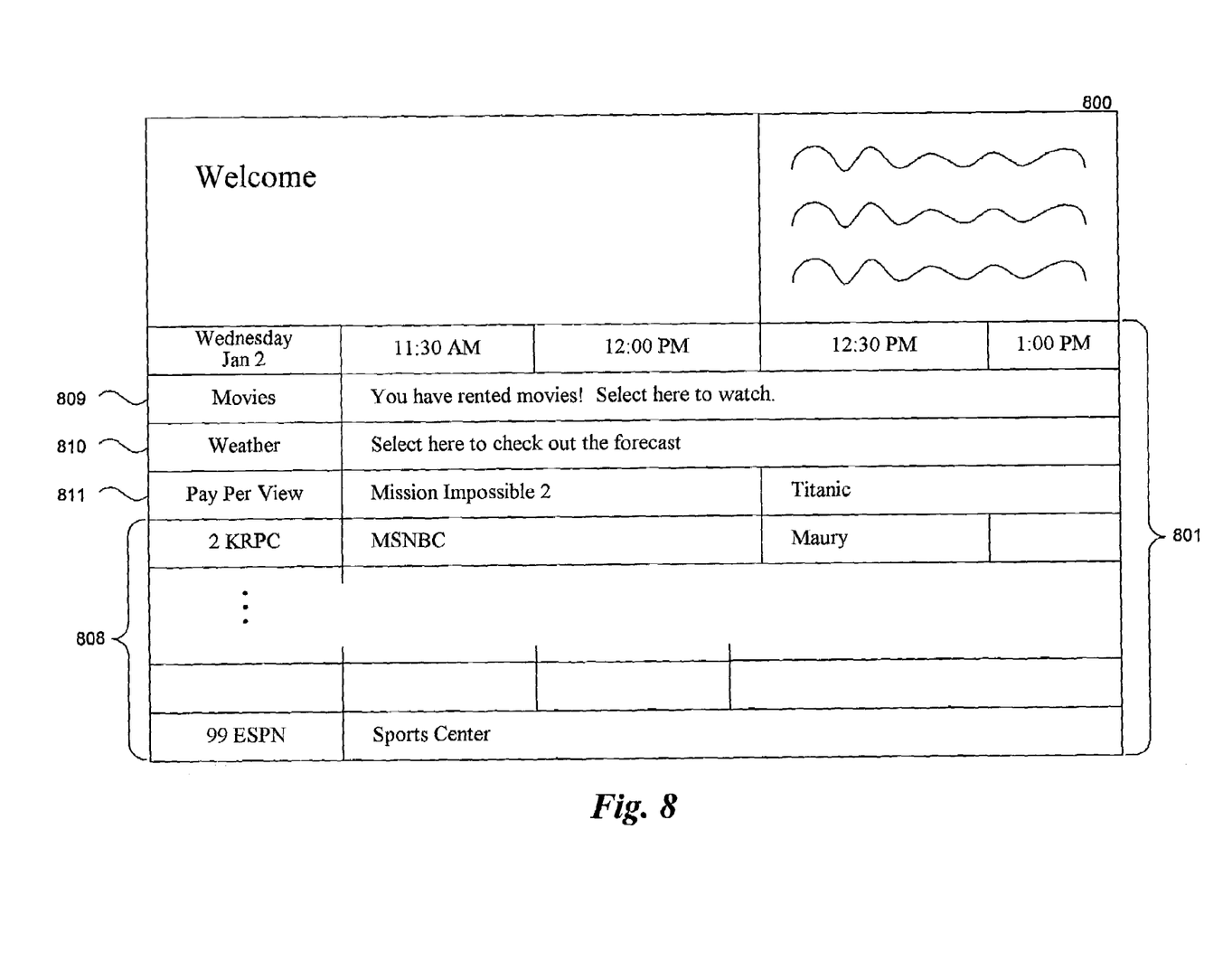
FIG. 8 illustrates the integration of television programming information with on-demand programming information on a single interactive program guide in one embodiment.

FIG. 8 illustrates the integration of television programming information with on-demand programming information on a single interactive program guide in one embodiment. Interactive program guide 800 includes a program grid 801. The program grid includes television programming rows 808 and a pay-per-view row 811. The program grid also includes on-demand programming information rows 809 and 810. Row 809 includes information related to on-demand movies that the user has rented, and Row 810 includes information related to weather forecasting. More generally, the interactive program guide may contain a row for various types of on-demand programming such as access to particular web sites. A user selects rows 809 and 810 to display more information about the on-demand programming.

Figure 9:
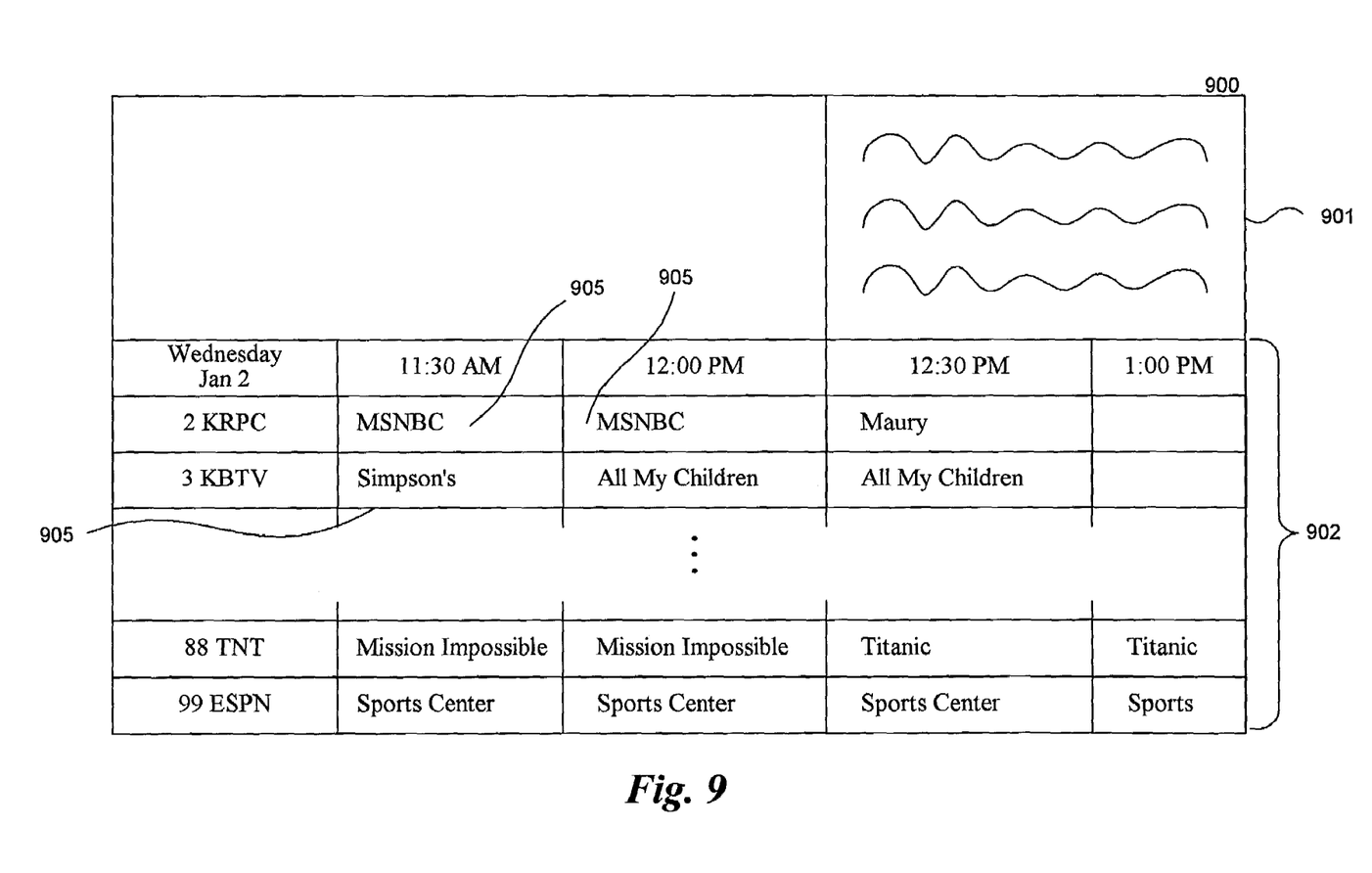
FIG. 9 illustrates an interactive program guide with regular-sized cells in one embodiment.
Figure 10:
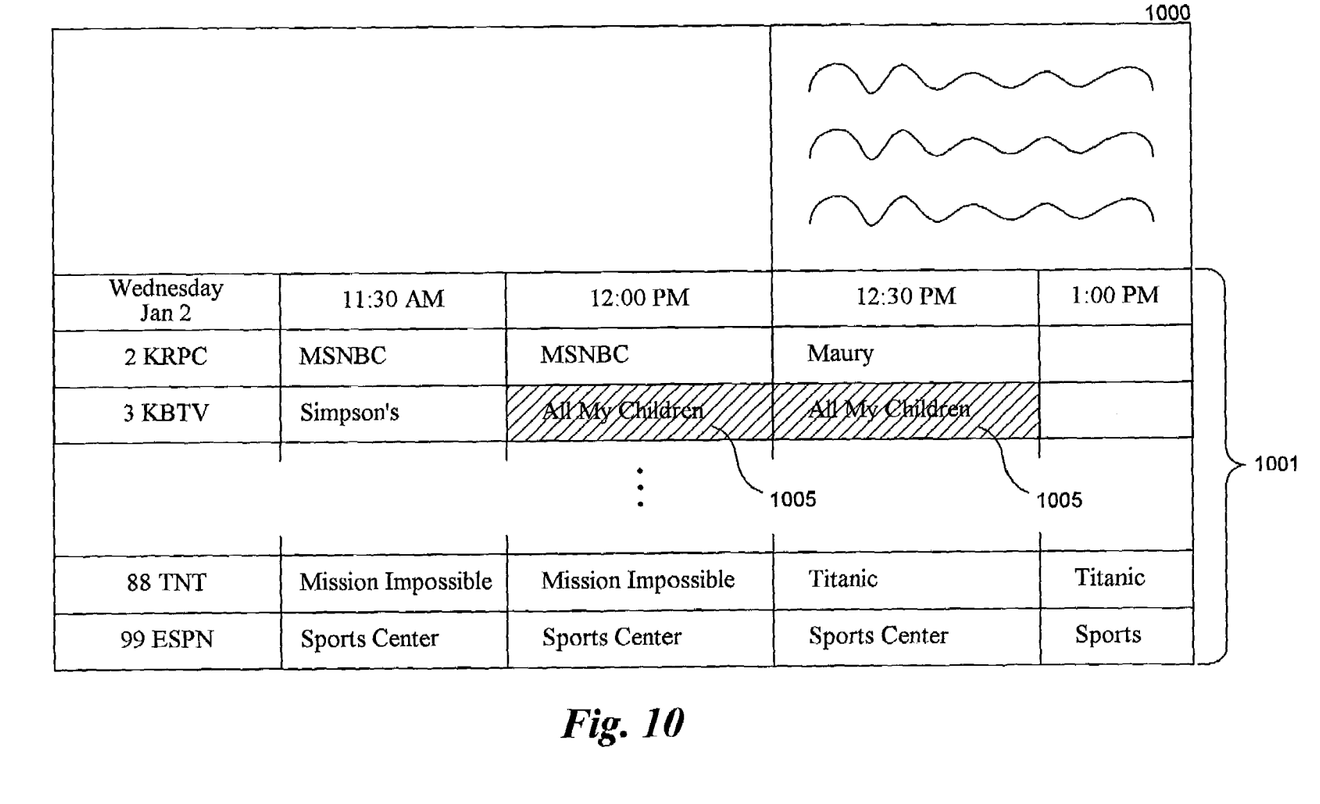
FIG. 10 illustrates an interactive program guide with regular-sized cells when the user selects a cell.
Figure 11:
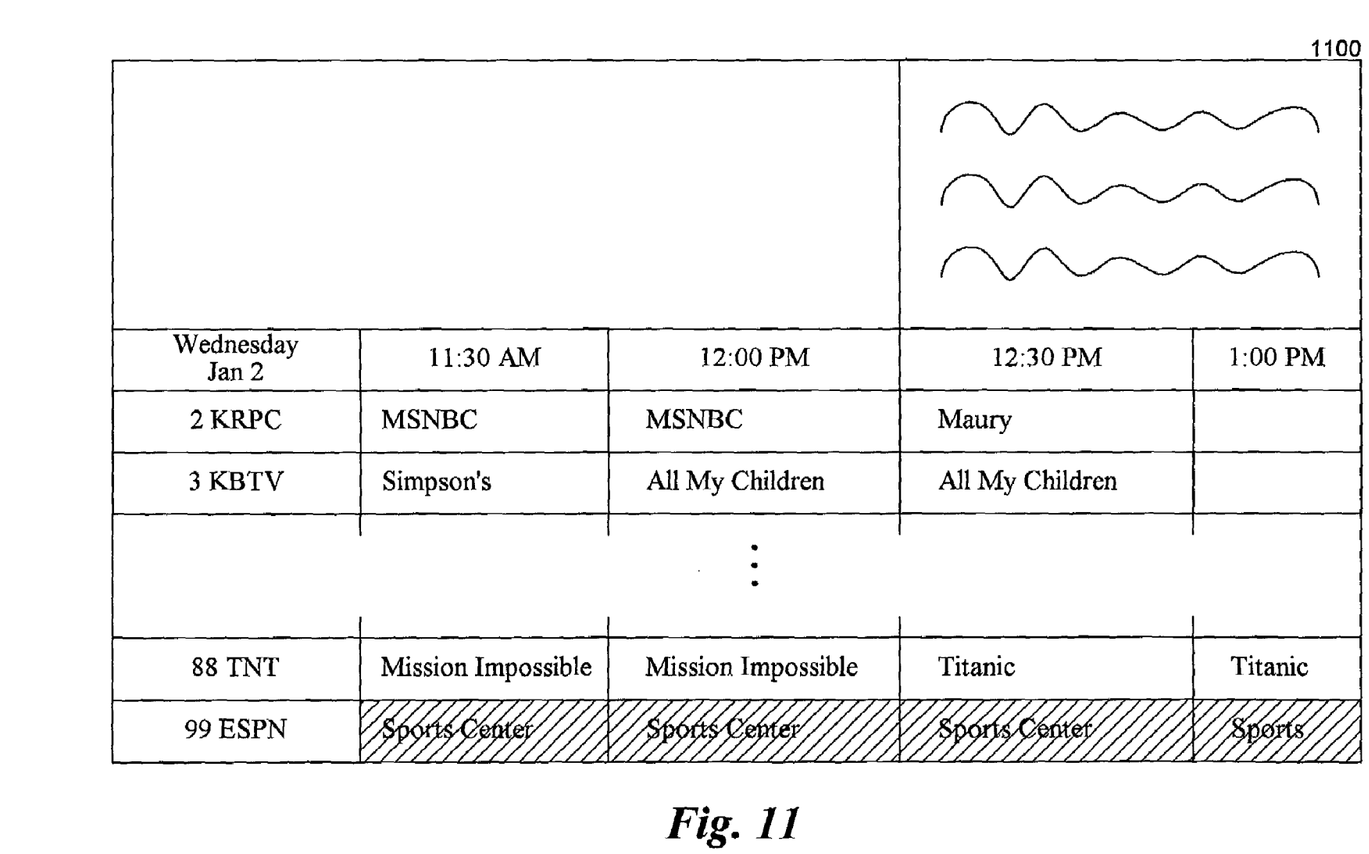
FIG. 11 illustrates another example of the interactive program guide when the user selects a cell of a program that is longer than 30 minutes.

FIG. 9 illustrates an interactive program guide with regular-sized cells in one embodiment. The interactive program guide 900 includes program grid 902. The program grid includes cells 905 all of the same size. In this example, the width of the cell corresponds to a 30-minute programming slot. Some programs, however, are longer than 30 minutes. For example, the program "All My Children" broadcast on channel 3 starting at 12:00 PM is 60 minutes long. Thus, the title is repeated twice in each of the two regular-sized cells. FIG. 10 illustrates an interactive program guide with regular-sized cells when the user selects a cell. The interactive program guide 1000 includes program grid 1001. When the user selects one of the cells for the content "All My Children," the interactive system highlighted all cells associated with that content. As a result, the user can quickly see the start and end time associated with that content. One skilled in the art will appreciate that a cell can be selected in various ways, such as tabbing from one cell to the next, moving a pointer over a cell, clicking on a cell, or so on. FIG. 11 illustrates another example of the interactive program guide when the user selects a cell of a program that is longer than 30 minutes. In this example, the user selected one of the cells of channel 99. Since each of the cells for channel 9 relates to "SportsCenter," the interactive system highlighted each cell. Alternatively, the interactive system may determine that "SportsCenter" is continuous and only highlight the currently selected cell rather than all cells for the content.

Figure 12:
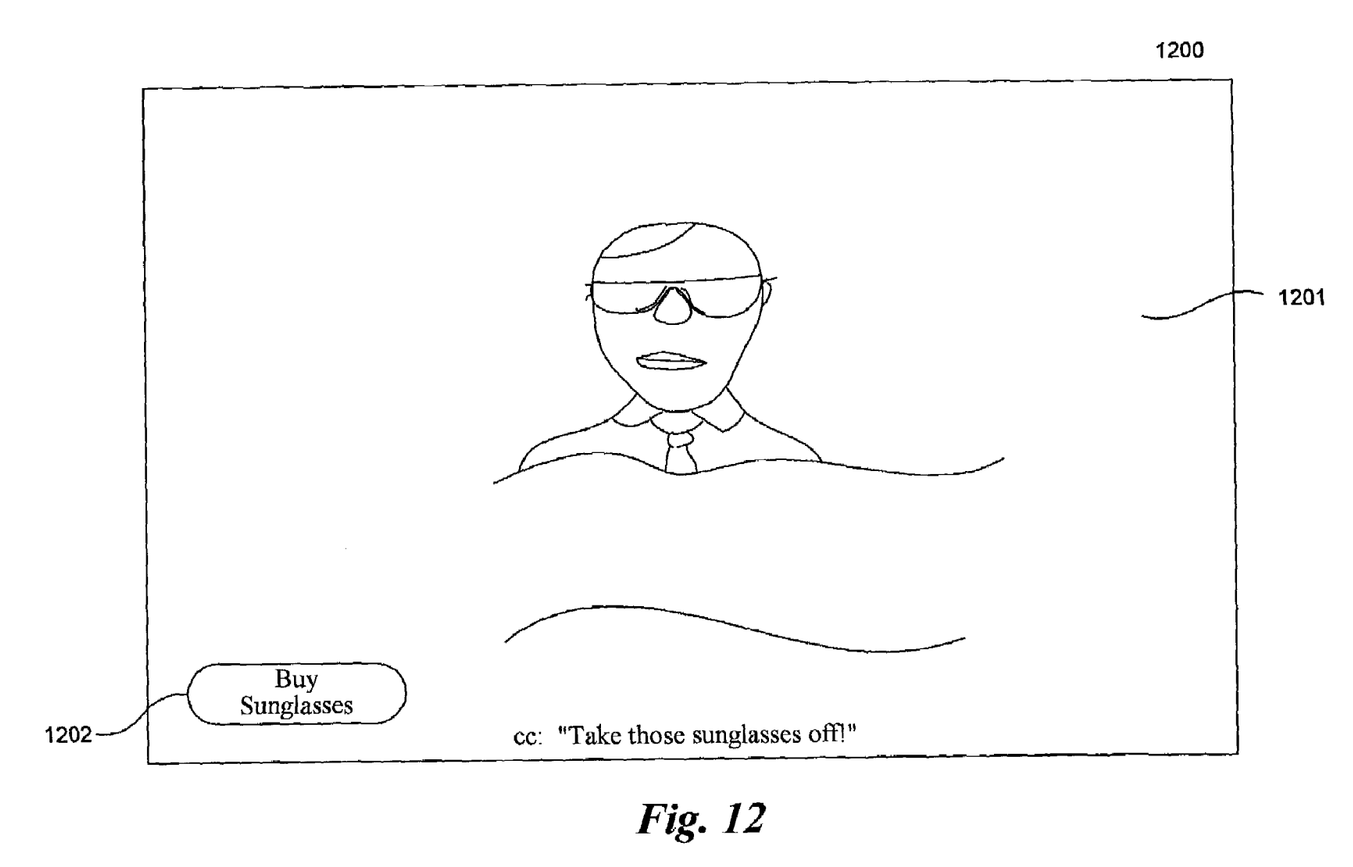
FIG. 12 illustrates an example television screen in which ATVEF information has been embedded.

FIG. 12 illustrates an example television screen in which ATVEF information has been embedded. Television screen 1200 displays a video 1201. The television screen also displays a button 1202. The button 1202 was generated by the set-top box in response to detecting that ATVEF information was included in a frame of the movie being displayed. In this example, the set-top box displayed the button to indicate that the user can buy sunglasses. The movie happens to include actors who wear sunglasses and part of the dialogue of the movie discusses sunglasses. In one embodiment, the interactive system parses the closed caption text to identify discussion topic of the movie. The end this case, a discussion topic related to sunglasses.

Referring to FIG. 1, the content server received the content from various content sources that may or may not include ATVEF information or other interactive enhancement information. The content server may add ATVEF links to content that does not include them or may modify the ATVEF links on content that does include them. For example, the content server may have the user's profile information and may be able to provide ATVEF links that are customized to the user's profile. So, for example, if a user has previously purchased a certain brand of sunglasses, then the content server may replace the ATVEF link indicating to buy sunglasses with the link indicating to buy a case for the sunglasses. More generally, the content server that may add ATVEF links to on-demand video which traditionally does not include any ATVEF links.

Figure 13:
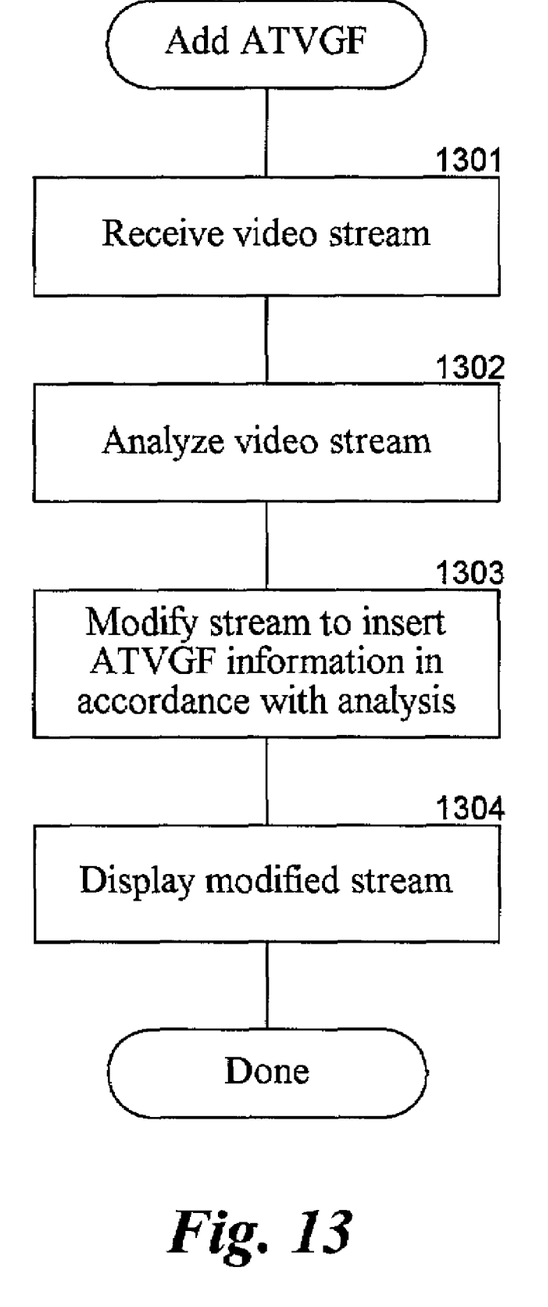
FIG. 13 is a flow diagram illustrating a component for adding ATVEF information to a video stream in one embodiment.

FIG. 13 is a flow diagram illustrating a component for adding ATVEF information to a video stream in one embodiment. In block 1301, the component receives the video stream. In block 1302, the component analyzes the video stream to determine how the video stream should be modified with ATVEF information. Such analysis may include analyzing closed caption information that accompanies the video stream. Such modification may include the adding of ATVEF information, or the updating of the ATVEF information previously added to the video stream. In block 1303, the component modifies the video stream to insert ATVEF information in accordance with the analysis of block 1302. In step 1304, the component displays the video stream as modified in block 1303 and then completes.

The set-top box and the content server may be computers that include a central processing unit, memory, and input devices (e.g., keyboard or remote control), output devices, and storage devices (e.g., disk drives). The memory and storage devices are computer-readable media that may contain instructions that implement the interactive system. In addition, the data structures and message structures may be stored or transmitted via a data transmission medium such as the Internet. Various communication links other than the Internet may be used such as local area networks, wide area networks or point-to-point connections.

From the foregoing, it will be appreciated the various embodiments of the invention have been described herein for purposes of illustration, but one skilled in the art will appreciate that modifications may be made without deviating from the spirit and scope of intervention. Accordingly, the invention is not limited except as by the appended claims.

We claim:

1. A method in a video server for modifying video to be sent to a user on-demand, the method comprising:
    receiving from the user a request to send the video to the user;
    retrieving profile information for the user, the profile information updated responsive to previous purchases of the user, the profile information comprising user specified filtering criteria, the user specified filtering criteria adapted to cause an interactive program guide to be displayed with user-identified information filtered out;
    based at least in part on input from the user, dynamically and individually for the user modifying the video by adding ATVEF information to the video based on the retrieved profile information of the user and the previous purchases of the user and the user's probable future purchases in view of his previous purchases; and
    transmitting the modified video to the user.

2. The method of claim 1 wherein the modifying includes evaluating rules to determine whether the video should be modified.

3. The method of claim 1 wherein the video is an on-demand movie.

4. The method of claim 3 wherein the modifying occurs dynamically as the movie is being transmitted to the user.

5. The method of claim 1 wherein the video includes frames and the modifying occurs dynamically on a frame-by-frame basis.

6. The method of claim 1 wherein the ATVEF information relates to purchasing an item that is related to the video to be transmitted.

7. The method of claim 1 including wherein the modifying is automatic, the modifying based on an automatic analysis of closed caption information relating to the video.

8. A method in a content server for enhancing content being broadcast, the method comprising:
    receiving the broadcasted content;
    retrieving profile information related to a destination to which the received content is to be transmitted, the profile information updated responsive to previous user purchases, the profile information comprising user specified filtering criteria, the user specified filtering criteria adapted to cause an interactive program guide to be displayed with user-identified information filtered out;
    adding ATVEF information to the received content based on the retrieved profile information, input from the user, the previous user purchases, and probable future purchases in view of previous purchases; and
    transmitting the received content with the added ATVEF information to the destination.

9. The method of claim 8 wherein the adding of ATVEF information includes modifying ATVEF information included in the received content.

10. The method of claim 8 wherein the adding of ATVEF information includes adding ATVEF to content that does not include ATVEF information as broadcasted.

11. The method of claim 8 wherein the added ATVEF information is based on an automatic analysis of closed caption information.

12. The method of claim 8 wherein the received content includes frames and the ATVEF information is added on a frame-by-frame basis.

13. A method in a video server for modifying video to be sent to a user on-demand the method comprising:
    receiving from the user a request to send the video to the user;
    retrieving profile information for the user, the profile information updated responsive to previous purchases of the user;
    dynamically and individually for the user adding interactive content information to the video based upon the profile information, input from the user, the previous purchases of the user, and the user's probable future purchases in view of his previous purchases, the profile information comprising user specified filtering criteria, the user specified filtering criteria adapted to cause an interactive program guide to be displayed with user-identified information filtered out; and
    transmitting the video with the added interactive content information to the user.

14. The method of claim 13, further comprising evaluating rules to determine whether interactive content should be added to the video.

15. The method of claim 13 wherein the video is an on-demand movie.

16. The method of claim 13 wherein the video includes frames and the adding occurs on a frame-by-frame basis.

17. The method of claim 13 wherein the interactive content information is ATVEF information.

18. The method of claim 17 wherein the ATVEF information relates to purchasing an item that is related to the video being transmitted.

19. The method of claim 17 wherein the ATVEF information relates to descriptive information regarding the video.

20. The method of claim 13 including wherein the adding is automatic, the adding based on an automatic analysis of closed caption information relating to the video.

* * * * *